(No Model.) 4 Sheets—Sheet 1.

A. W. McKENZIE.
WINDMILL.

No. 356,145. Patented Jan. 18, 1887.

WITNESSES: Edw. O. Zwietusch. E. R. Johnson

INVENTOR Allen W. McKenzie
BY P. H. Perkins.
ATTORNEY (No Model.) 4 Sheets—Sheet 2.

A. W. McKENZIE.
WINDMILL.

No. 356,145. Patented Jan. 18, 1887.

WITNESSES:
Edw. O. Zwirtusch
E. R. Johnson

INVENTOR
Allen W. McKenzie
BY
P. H. Perkins
ATTORNEY (No Model.) 4 Sheets—Sheet 3.

A. W. McKENZIE.
WINDMILL.

No. 356,145. Patented Jan. 18, 1887.

WITNESSES:
Edw. O. Zwietusch.
E. R. Johnson

INVENTOR
Allen W. McKenzie
BY
P. H. Perkins
ATTORNEY (No Model.) 4 Sheets—Sheet 4.

A. W. McKENZIE.
WINDMILL.

No. 356,145. Patented Jan. 18, 1887.

WITNESSES:
Frank L. Wright
C. E. Buell

INVENTOR
Allen W. McKenzie
BY
B. H. Perkins
ATTORNEY

UNITED STATES PATENT OFFICE.

ALLEN W. McKENZIE, OF BLACK EARTH, WISCONSIN, ASSIGNOR TO HEMAN W. McKENZIE, OF SAME PLACE.

WINDMILL.

SPECIFICATION forming part of Letters Patent No. 356,145, dated January 18, 1887.

Application filed March 11, 1886. Serial No. 194,883. (No model.)

*To all whom it may concern:*

Be it known that I, ALLEN W. McKENZIE, a citizen of the United States, residing at Black Earth, in the county of Dane and State of Wisconsin, have invented certain new and useful Improvements in Windmills; and I do hereby declare the following to be a full, clear, and exact description of the invention, such as will enable others skilled in the art to which it pertains to make and use the same.

My invention relates to that class of windmills known as "horizontal" windmills, in which the wheel revolves horizontally about a vertical axis having its bearing as low down in the tower as may be desired for the purpose of securing proper stability.

It consists, further, in an independent oscillating frame centrally pivoted about said vertical shaft and provided with vibrating vertical wind-guides and a wind-vane on which the wind operates to keep the wind-guides continuously between the wind and the wheel proper.

It consists, further, in so connecting said wind-guides with suitable link-sections and a governing device independent of the wind-wheel proper that the wind-guides may be opened or closed at pleasure, by which means the operator may stop the mill or set it in motion.

It consists, further, in such an arrangement of said governing device that when the wind is too strong, consequently tending to produce too great a speed in the wind-wheel, the wind-guides will close partially or entirely, depending on the strength of the wind, and remain in this position until the wind diminishes to the normal amount calculated to work the mill, when the guides will open again automatically.

It consists, finally, in the device as a whole.

Figure 1:
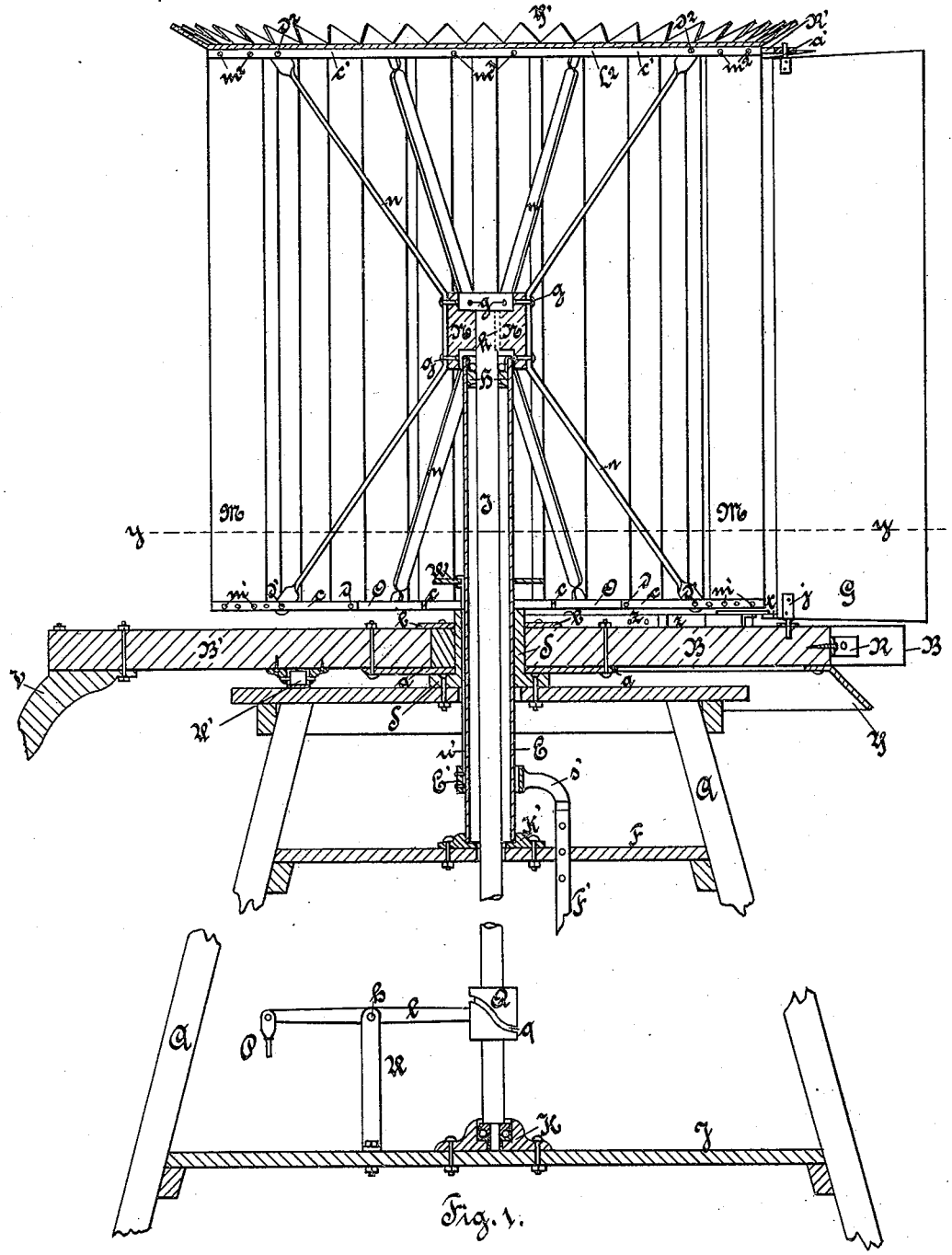
Figure 2:
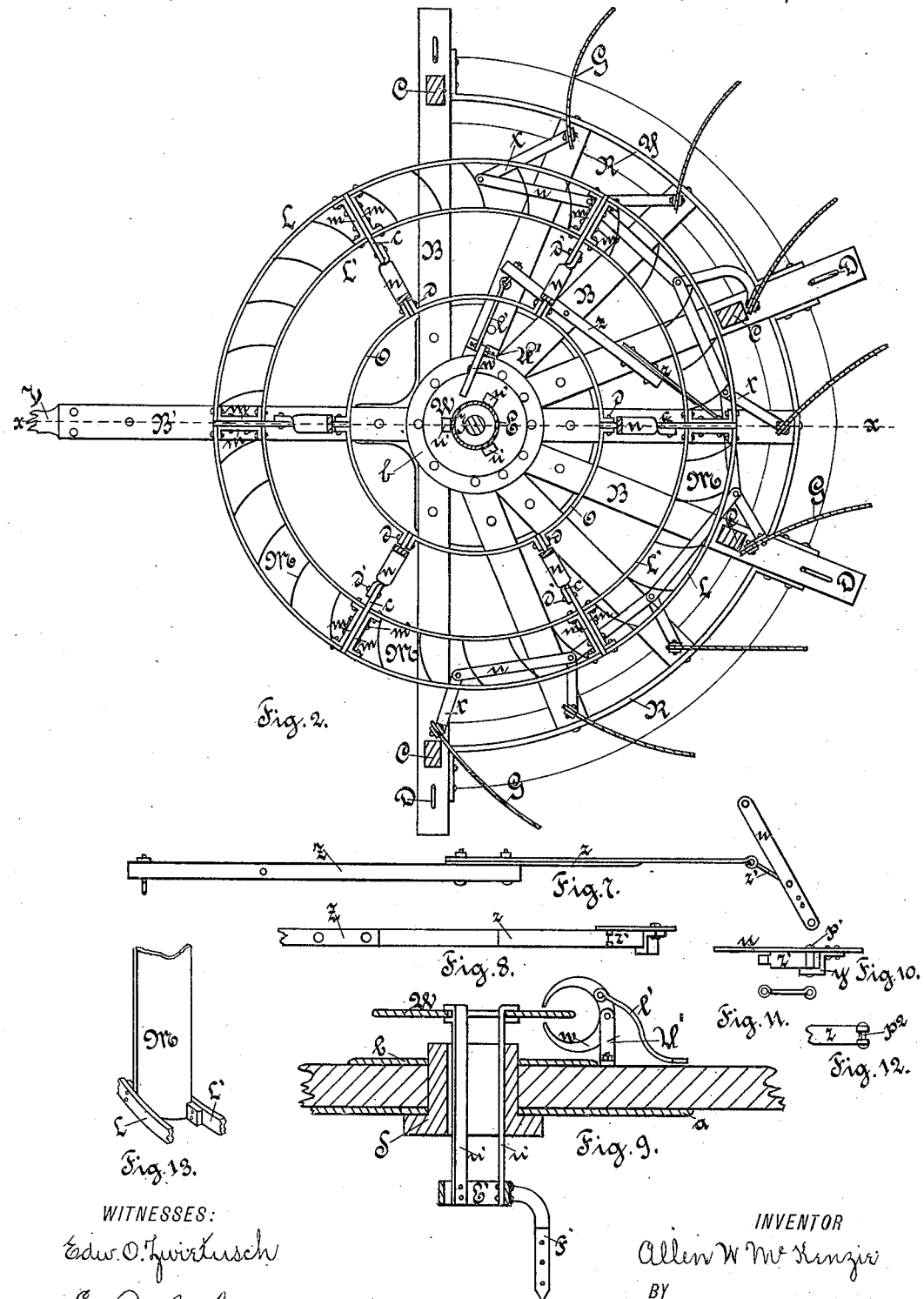
Figure 3:
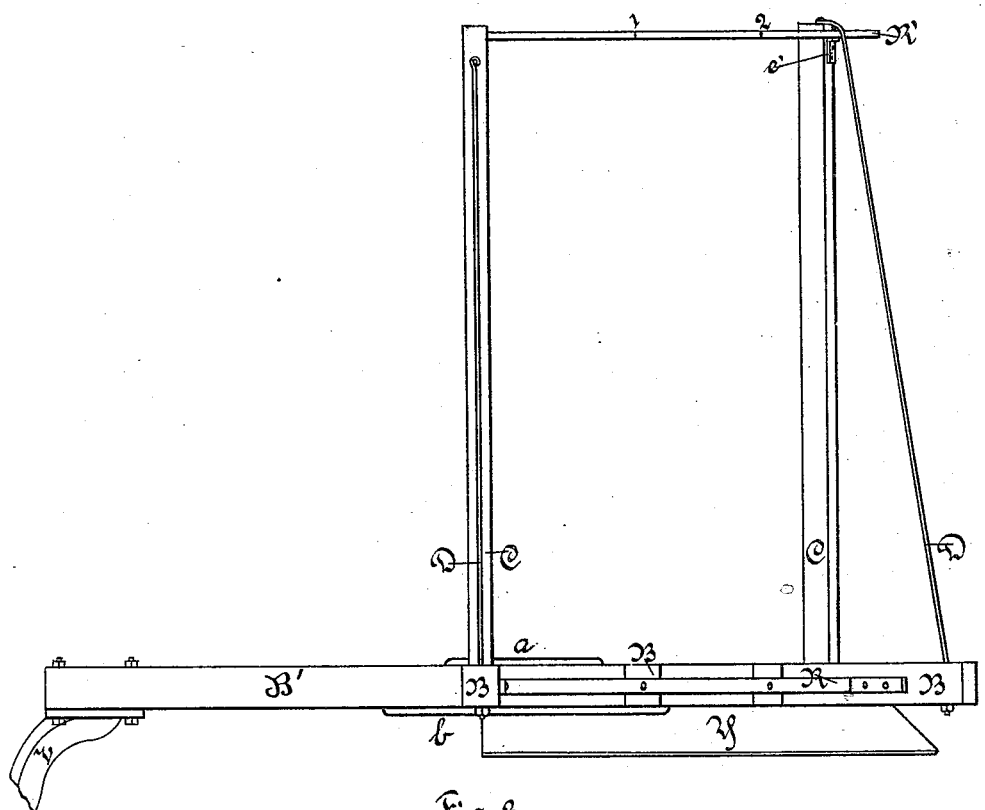
Figure 5:
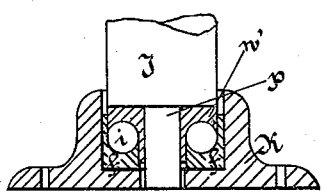
Figure 4:
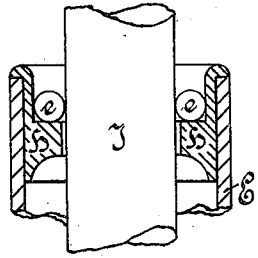
Figure 6:
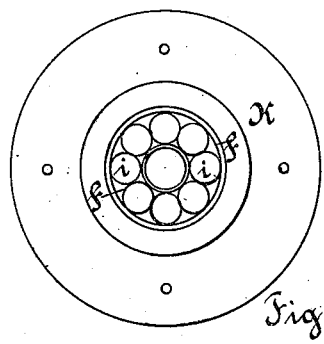
Figure 14:
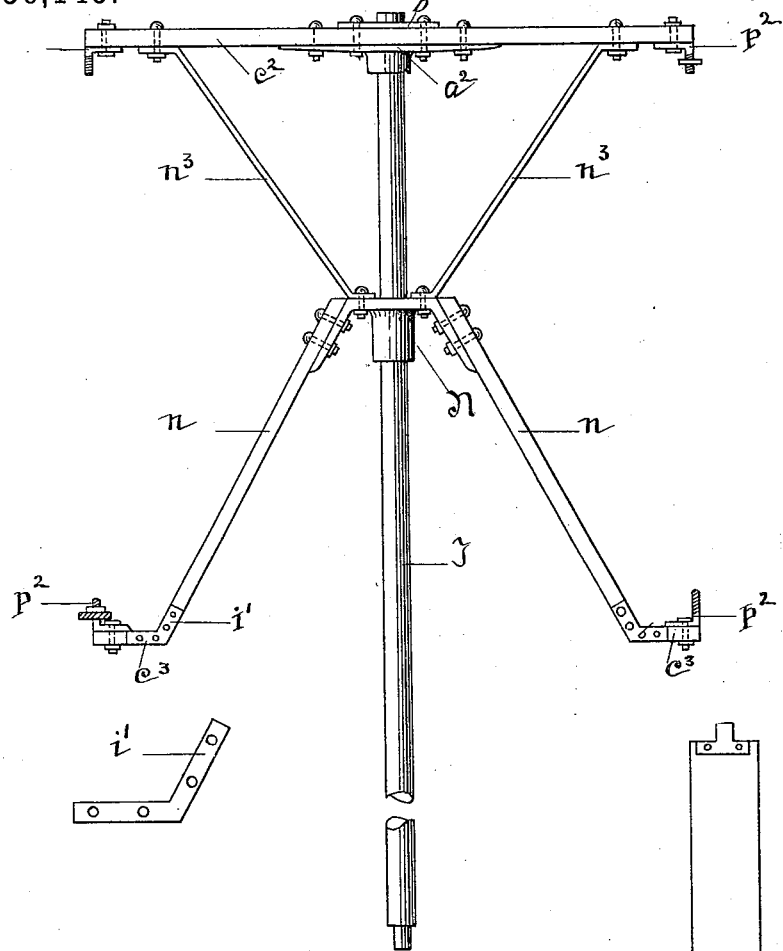
Figure 15:
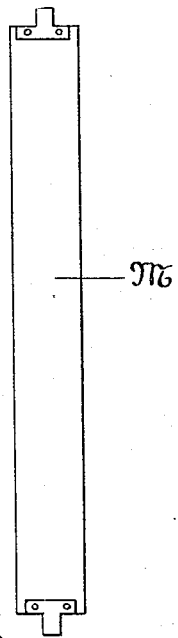

Figure 1 is a vertical longitudinal section through the line *x x* of Fig. 2, showing one-half of the mill and tower in side elevation. Fig. 2 is a horizontal section through the line *y y* of Fig. 1. Fig. 3 is a side elevation of the oscillating frame which supports the vane and wind-guides. Fig. 4 is a detail of the side bearing for the upper portion of the vertical shaft. Fig. 5 is a detail of the end bearing of the vertical shaft, as shown in Fig. 1. Fig. 6 is a detail of the lower bearing-plate with the anti-friction balls disposed thereon. Fig. 7 is a top view of a portion of my governing device attached to one of the links connected with the wind-guides. Fig. 8 is a side elevation of the same. Fig. 9 is a detail view in section showing the connection of the hand-operating device with the governing mechanism. Figs. 10, 11, and 12 show in detail the method of connecting the governing device with the link-connections of the wind-guides. Fig. 13 is a detail plan view showing the method of fastening the slats or sails to the parallel rims. Figs. 14 and 15 illustrate a modified construction of the wind-wheel frame.

In the drawings similar letters, where they occur, refer to like parts throughout the several views.

A represents the tower on which my improved windmill is mounted. The sleeve S is firmly bolted to the center of the tower-top. Extending radially from this sleeve, and firmly bolted between the lower and the upper metal disks, *a* and *b*, respectively, are the arms B, at the outer end of which are pivoted the wind-guides G. The rearmost of the arms B extends diametrically through the mill, immediately back of the upright tube E, and has an upright, C, at each end. The other two uprights C are erected, respectively, near the outer ends of the remaining two longer arms, B. (See Fig. 2.) These uprights, besides being mortised into the radial timbers B, are further secured by the stay-rods D. The number of arms B and uprights C may be varied according to circumstances.

I do not restrict myself to any particular number, neither do I wish to limit myself to this particular construction of an oscillating shield or shell guided by a vane and pivoted about the central shaft, the main idea being to produce by this, or by equivalent mechanical devices, a shield or shell adapted to oscillate about the central shaft, and to act constantly either as a shield or wind-gatherer, as may be desired, and covering about one-half the circumference of the wind-wheel proper.

The arm B' extends rearward and at right angles to the rearmost arm B, above described, and to its outer end is attached a vane, V, in a position below the wind-wheel proper so that the full force of the wind may be utilized unimpeded by the wheel or by the oscillating frame. This vane V, in connection with the oscillating frame or shield just described, is adapted to be acted on by the wind, so as to keep the wind-guides constantly on the windward side.

The wind guides G answer three distinct purposes—namely, of wind-gatherers, wind-guides, and, in connection with devices hereinafter to be explained, they also act as governors or regulators of the speed of the wind-wheel proper.

In wind-wheels of this class heretofore invented or in use the wind-guides, when fixed, have generally been tangential to the circular containing-rims; or, if pivoted, they have all been adjusted in the same position relative to the center of oscillation. By such constructions only a comparatively small arc of the shell or shield, so far as it operates as a wind-gathering device, has ever been available for that purpose. In my device the wind-guides extend fully half-way around the wind-wheel, the rearmost guides on either side extending back at proportionately greater angles, in order to catch the wind and deflect it from their concave faces onto the concave faces of the sails M in the wind-wheel. (See Fig. 2.) By this disposition and arrangement of the wind-guides I obtain a large increase of power in this class of mills.

For the purposes of this description let the wind-current be supposed to pass from right to left in the direction indicated by the line $x\ x$, Fig. 2. The rim R' is a flat band, preferably of iron, which I prefer to make polygonal rather than circular, as shown by the angles 1 and 2, and rests on bracket-pins $e'$, bolted to the inner face of the two rearmost of the uprights C, and to the outer face of the other two uprights. (See Fig. 3.) The wind-guides G are pivoted at the lower end by the pivots $j$, extending from ears riveted to the face of the guide into holes in the arms B, and at the upper end by the pivots $a'$ in the same vertical line, fastened to the guide in a similar manner and extending upward through a hole in the rim R'. Although these two pivotal connections will be found sufficient for mills of ordinary size, yet in extra large sizes the wind-guides may be pivoted in a similar manner at a third point anywhere in the same vertical line between the two pivots already described, said extra pivots being attached to an extra rim supported on arms of sufficient strength extending from the central hub N, said arms uniting the several sections of said extra rim in the same manner, and to the same effect as the radial arms $c$ unite the sections of the rim O, hereinafter described. The upper rim R', extending outside of the two forward uprights and inside the two rear uprights, as described, presents, when the wind-guides G are closed, not a cylindrical, but an ellipitical or "duckbreast" barrier. This arrangement answers the purpose of shutting off the wind from the mill, less resistance being offered than would result if the guides, when closed, formed a semicircular or purely cylindrical barrier. The lower and the upper crown strips Y and Y', respectively, are for the purpose of deflecting wind into the mill. The arms B terminate at the sleeve S, leaving sufficient circular space about the same, so that the whole framework supporting the wind-guides and their connections, being pivoted about the central sleeve, S, may oscillate freely about the windwheel in either direction, always being guided by the wind-vane V.

The wind-wheel proper is constructed as follows: The outer and inner lower circular rims, L and L', respectively, which I prefer to make of wrought iron, are bolted together in sections by means of U shaped iron braces or arms $m$, which in turn are bolted to the outward ends of the radial arms $c$ by the bolts $m'$; but I do not wish to restrict myself to this particular method of fastening the rims L and L' together, the main idea being two parallel circular metal rims, in sections preferably, to which may be secured in regular succession the lower ends of the wind-slats M. The radial arms $c$ extend inward, and, in a similar manner to that just described for the rims L L', unite the sections of the inner rim, O, being the same in number as those of the outer rims, by means of the bolts $d$, through the inner ends of said arms, and corresponding angles on the ends of said sections, all being so adjusted in tension as to strengthen the parts thus connected.

The upper frame-work of the wind-wheel is constructed as follows: The central iron strip, $c'$, extends diametrically through the wind-wheel. To its outer extremities are fastened by the bolts $m^2$ U-shaped braces on either face of said strip, which secure two parallel circular rims (not shown in the drawings) of the same diameter, same distance apart, and composed of the same number of sections, bolted together in a similar manner, and for the same purposes as in the lower rims, L L'. The bolts $m^3$, (see Fig. 1,) at the center of the strip $c'$, secure the two U shaped strips of iron, one to each of the opposite vertical faces of the central strip, $c'$, the arms of said U-shaped parts extending outward radially, their outer ends being secured between the sections of the upper parallel rims in the same manner as the extremities of the strip $c'$ are fastened. By this means six radial arms divide the upper circular rims into six sections, corresponding to the sections in the lower rims. The rims L, L', and O all being in the same horizontal plane are suspended from the central hub, N, by means of the several tie-rods, $n$, preferably flat wrought-iron strips, the faces being upset at the ends, to adapt the strips to be fastened by the rivets $d'$ to the vertical faces of the arms $c$. The tie-rods extend upward and inward to the central hub, N, to which they are fastened by the bolts $g$, whence they bend outward and extend upward, and are fastened by their upset faces to the vertical faces of the radial arms of the upper frame-work by means of the bolts $d^2$ in a manner similar to that already described in the lower frame-work. I do not, however, wish to limit myself to the construction of the upper frame-work just described, as it is obvious that other mechanical combinations in common use may be employed to the same purpose; nor do I wish to limit myself strictly to any particular number of sections in the wind-wheel rims, as their number will be determined chiefly by the size of the wheel employed.

It is obvious that in the construction described the number of radial arms $c$ and tie-rods $n$ will be the same as the number of sections in the rims.

The slats or wind-sails M may be either wood or metal; but I prefer the latter. They are all of the same size and pattern, being slightly curved, so as to present the concave face to the wind-current as it is deflected from the wind-deflecting faces of the guides G. Their outer edge, being curved sufficiently to provide a bearing-surface against the inside vertical face of the rim L, is riveted to the latter in the ordinary way. The inner edge is cut and turned back to form an ear, which is riveted to the outer vertical face of the inner rim, L′, in a similar manner, all as shown in Fig. 13. The upper ends of the slats M are fastened between the corresponding upper rims in a similar manner; but I do not confine myself to this particular method of fastening the slats M between parallel circular rims, as it is obvious that there are various known methods of accomplishing this effect.

In the drawings I have shown five slats to every section; but I do not confine myself to any particular number of wind slats or sails, as their number will vary, depending on the size of the wheel and the particular purpose for which it may be designed. The breadth of the wind-sails may also be varied at will, the distance between the parallel containing-rims being varied to correspond.

As a modified construction, the shaft I may be continued through to the top of the wheel. The disk and collar $a^2$ is made preferably in a single casting, and is rigidly secured to the shaft I. Between this and an upper disk or clamp, $b^2$, through which the shaft I also extends, I bolt the radial arms $c^2$. The central hub, N, is rigidly fastened to the shaft I, being so modified in shape, however, as to present a dished or downward and outward flaring flange, to which the series of braces $n$ and $n^3$ are adapted to be bolted, as shown in Fig. 14, the former to the flange and the latter to the disk or upper surface of the casting N. The braces $n$ extend downward and outward to the bottom of the wind-wheel proper where they are joined by angle-irons $i'$ to the horizontal radial arms $c^3$, which extend outward the same distance radially as do the upper arms, $c^2$. The braces $n^3$ extend upward and outward and are bolted to the radial arms $c^2$, as shown in the drawings. Instead of the two braces $n$ and $n^3$ a single brace may be employed, being fastened to the central hub, N, to the upper radial arms and to the inner end of the lower radial arms, by its upset face, in a manner similar to that already described. With this modification I am enabled to use but a single circular rim at the top and at the bottom. The lower rim may be secured by resting on the pins $p^2$, bolted to the outer ends of the arms $c^3$ and extending through corresponding holes in the rim, and secured, if desired, by a nut on the upper end of said pin. The upper rim will be secured in a similar manner to pins extending downward from the under side of the arms $c^2$ at their outer end.

In mills such as I have described the number of braces $n$ and arms $c^2$ and $c^3$ will be six, and in large mills there will be six or more braces $n^3$. The sails M may be fastened to the single rims by means of a flat lug or tongue being cast with suitable ears or jaws adapted to be fastened rigidly to the top and bottom of the sails M, as shown, said lugs being mortised closely into corresponding holes in the upper and lower rim between which the sails M are held firmly and rigidly. By this modified construction I am enabled to provide the necessary extra strength for large mills without increasing their weight in proportion. The upright pipe E fits closely in the central sleeve, S, and is firmly secured in the seat K′, which rests on the cross-piece below the platform. The central hub, N, is recessed on its under side so that no part of it touches or bears upon the pipe E and its connections. The hub N is keyed by the key $k$ to the vertical shaft I, so that the whole weight of the wind-wheel is transmitted through the vertical shaft to its end or thrust bearing in the seat K, by which means I insure much greater stability in the mill and tower than has heretofore obtained in this class of mills.

Although I have shown the end bearing of the shaft I as resting on one of the lower cross-timbers, J, of the tower, yet it is obvious that this bearing may be located at any point in the same vertical line between the surface of the ground and the top of the tower.

The sleeve H is adapted to depend from the top of the pipe E, and is provided with a circular track or shelf on which are supported anti-friction balls $e$, all of the same size, and preferably of such a number that when they are in contact they will exactly fill the annular space between the sides of the sleeve H and the shaft I; but I do not wish to limit myself to balls all of the same size. The shaft I does not touch the sleeve H, but bears entirely against the anti-friction balls $e$, which are for the purpose of taking up the side thrust. The shaft I extends downward through the pipe E and bearing K′, terminating at its lower end in a shoulder and journal-pin, $p$, the shoulder resting on the circular bearing-plate $n'$, and the journal-pin $p$ passing downward through a central extension of the same and through the center of the lower bearing, $f$. The plate $n'$ is provided on its under surface with a circular groove or seat, which fits snugly over and onto the anti-friction balls $i$, which in turn rest in a corresponding circular groove or seat of the same size in the bearing-plate $f$, in which grooves or circular channels the anti-friction balls are adapted to revolve in any direction, being perfect spheres and all of the same size and material. The bearing mechanism just described rests in a seat, K, preferably of cast-iron, and bolted to the center of the cross-timber J. As I have indicated in Fig. 5, whatever lateral thrust there may be will be taken up entirely by the anti-friction balls, neither the shaft I nor the pin $p$ touching the seat K at any point.

I attach to the shaft I a collar, Q, provided with a cam-slot, $q$, in which operates a pin attached to the lever $l$, pivoted at $h$ to the upright U, said cam-slot when said shaft is revolving acting upon said pin and through said lever to produce a reciprocating motion in the plunger P, by which means pumping devices and other mechanisms may be operated. It is obvious that the same result may be obtained by using the common device of bevel-gearing in connection with a rotating disk and crank-pin. Said pin may, if desired, be provided with a roller adapted to operate in the slot $q$.
The arms $t$ are riveted to the lower edge of the guides G in front of the pivotal bearings $j$, and are hinged at their inner ends to the link-sections $u$. By this means all the wind-guides G are connected, so that when one turns all will turn, or when either one of the links is moved toward or from the center of the wheel every wind-guide will turn at the same moment in the same direction.

The collar E', adapted to play freely over the upright pipe E, terminates in a shank, $s'$, to which is riveted the handle F' of sufficient length to be conveniently operated from the ground. Riveted to the collar E' are three uprights, $u'$, which extend upward through vertical slots in the sleeve S, terminating in jaws which hold the horizontal plate W. The standard U', bolted to one of the radial arms B, has pivoted to its upper end a lune-shaped rocker, $w$, the upper and lower arm of which approach each other with just sufficient space between the ends thereof to admit the plate W; but I do not restrict myself to this particular form of rocker. The arm or connecting-link $l'$, pivoted to the rocker $w$ above its connection with the upright U', is hinged to the end of the lever Z, which is pivoted to one of the arms B, and has bolted to its forward end the double spring $z$. The longer leaf of the double spring $z$ is hinged to the link $z'$, which in turn is hinged to one of the links $u$ by the pin $p'$ through the link $u$ and bracket $y$, bolted to it. The pin $p^2$ connects the springs $z'$ and $z$. (See Figs. 10, 11, and 12.)

By pushing up on the handle F' the plate W is raised and rotates the rocker $w$, which throws the arm $l'$ back and the spring $z$ and link $u$ backward, and at the same time in toward the center, thus closing the wind-guides G over each other and shutting off the wind from the wheel, thus stopping its motion. The handle may be locked in this position by means of a pin through the same extending into the tower or some part of it. To reverse this operation and open the wind-guides to the position shown in the drawings, the operator pulls down on the handle F', which may be held in position either by a pin, as above described, or by a weight of sufficient size attached to the end of said handle. By closing the wind-guides partially the operator may lessen the supply of wind, and consequently the speed of the wheel, as desired. When the guides are open, as shown in Fig. 2, the pressure of the wind above a certain degree will close the guides, at the same time forcing the links $u$ in and back, compressing the springs $z$. Whenever the wind-pressure amounts to less than the compressive force in the springs, the wind-guides will again open, partially at first, and entirely whenever the wind is equal to or less than the normal amount calculated to operate the machine. To the extent just described the governing device acts automatically to protect the wheel from too strong a wind-current and to regulate its speed. The friction-roller N' is journaled in bearings bolted to the under side of the arm B' and travels on a circular track, preferably of metal, on the top of the tower.

I am aware that horizontal windmills have heretofore been constructed wherein the wind guides and sails have been arranged vertically, said sails being fixed and said wind-guides being pivoted between horizontal stationary circular rims, and adapted to open and close automatically as well as by hand, thereby controlling the speed of the wind-wheel, and I do not claim such features broadly.

I am aware of the patent issued by the United States to Charles H. Burleigh and William A. Wheeler, November 2, 1880, No. 233,977, "Wind-Engine," and it is not my intention to claim anything covered by that patent; but What I do claim, and desire to secure by Letters Patent from the United States, is—

1. In a windmill having its wind-wheel mounted on a vertical shaft supported on end bearings at any point in the line of said shaft between the ground and the top of the tower, an oscillating frame, supporting wind-deflecting guides constantly held on the wind side of the wheel by a vane of suitable size attached to such frame below the level of the wind-wheel, said wind-deflecting guides being so constructed and disposed as to gather the wind at the sides as well as at the front of the wheel, and deflect it against the sails of the latter, in combination with said wind-wheel, vertical shaft, and governing device, substantially as set forth, and for the uses and purposes mentioned.

2. In a windwill of the class described, the system of links $u$, connected with each of the wind-guides G by means of the arms $t$, riveted to the lower end of said wind-guides, in combination with the link $z'$, double spring $z$, lever Z, connecting-link $l'$, rocker $w$, rocker-plate W, operatively connected with the uprights $u'$, attached to the vertically-adjustable handle F', adapted to be held either by weights or by stop-pin at any desired point in vertical adjustment, as hereinbefore described, whereby the system of links, springs, and levers herein described may be so held in adjustment that the wind-guides G, in operative connection therewith, will simultaneously close or open automatically, depending on the force of the wind, substantially as set forth.

3. The oscillating frame-work consisting of the radial supporting-arms B B', vane V, uprights C, wind-guides G, and pivot-sleeve S, in combination with the wind-wheel proper composed of the fixed concave vertical wind-sails M, sectional rims L L', arms $c$, inner sectional rim, O, tie-rods $n$, central hub, N, keyed to the central bearing, vertical shaft I, and the corresponding upper frame-work consisting of one central strip, $c'$, with U-shaped arms bolted to its center on either vertical face and securing at their outer ends parallel circular rims of the same size and number of sections as in the rims L L', all as set forth, and for the uses and purposes mentioned.

In testimony whereof I have signed this specification in the presence of two subscribing witnesses.

ALLEN W. McKENZIE.

Witnesses:
HEMAN W. McKENZIE,
SAMUEL CHARLESWORTH.